UNITED STATES PATENT OFFICE.

WILLIAM HORLICK, OF RACINE, WISCONSIN.

GRANULATED FOOD FOR INFANTS AND PROCESS OF PREPARING THE SAME.

SPECIFICATION forming part of Letters Patent No. 278,967, dated June 5, 1883.

Application filed March 9, 1882. (No specimens.)

*To all whom it may concern:*

Be it known that I, WILLIAM HORLICK, of Racine, in the county of Racine, and in the State of Wisconsin, have invented certain new and useful Improvements in the Manufacture of a Prepared Food for Infants and Invalids; and I do hereby declare that the following is a full, clear, and exact description thereof.

This invention has for its object, first, to provide a non-farinaceous highly-nutritious food for infants and invalids by combining the nutritive parts of the cereals with milk; and, secondly, to render such food free from all souring tendency irrespective of the climate or state of the atmosphere to which it may be subjected, and yet of such a nature as to be readily soluble in water.

In carrying out my invention I take equal parts of selected barley-malt and ground wheat (or oats) and thoroughly macerate or soften the same in pure fresh cow's milk, sufficiently to admit of the whole being stirred and mixed so as to form a loose soft mash. I then place the mash in a kettle provided with a steam-jacket, where it is gradually raised to a temperature of 150° Fahrenheit, and kept constantly stirred or agitated, so as to prevent the possibility of any damage thereto by reason of the heat. The mash being kept at this degree of heat (150° Fahrenheit) for half an hour, the starch is thus transformed into dextrine and grape-sugar through the action of the diastase contained in the malt. It is then raised to the temperature of 170° Fahrenheit, and retained at that degree of heat for fifteen minutes, after which it is taken out of the kettle, placed in bags, and pressed, the liquid extract running from the bags, when pressed, through very fine sieves, which serve to reject all husks and insoluble matter. This fine liquid is then put into a vacuum-pan provided with a strong central shaft having teeth or knives, the latter serving, when the shaft is revolved, during the evaporation or drying of the extract, to keep the mass cut up into small parts until the whole is reduced to a dry powdered extract. This extract readily dissolves again in water, and is put up for public use in cans or bottles.

The strength of the food is regulated by the quantity of water applied, the proportions usually being such as to render the food, when ready for use, about the consistency of milk.

It will thus be observed that by my improved process I produce a food possessing all the nutritive properties of the cereals and milk in a compact, dry, portable form, and which will be unaffected by the state of the atmosphere or climate, and ready for use at a moment's notice.

As the wheat is macerated in a crushed form, (as distinguished from a powder), all the phosphorus contained in the outer shell will be extracted, forming a valuable element in the food, the husks and other impurities having been separated by a careful process of sieving or straining, as before mentioned.

Another important advantage of my food, and which makes it of peculiar value to those residing in cities, where pure milk is only with great difficulty obtained, especially in warm weather, is that it wholly dispenses with milk ordinarily employed in mixing similar foods.

I desire to make some general observations as to what has heretofore been accomplished in the preparation of prepared foods, my object being to acquaint the public with the distinction existing practically between what I have done and what to my knowledge has been done by others.

In 1879 a patent was granted in England which describes a concentrated liquid extract prepared by mashing ground malt with warm water, straining, and reducing it by evaporation to the consistency of treacle. This extract is soluble in water, and may be combined with flour or saccharine matters, and also with milk and liquid extracts. In preparing a farinaceous food, baked wheat-flour is mixed with the concentrated malt extract, and the mixture dried on trays in a hot-air chamber. When dry it is pulverized and sifted and combined with plain baked flour, after which this mixture is passed through a sieve. It is noticeable that the extract is formed with water as an ingredient. I do not use water as a part of my extract; neither do I stop with the use of malt only, but go further, as has hereinbefore been pointed out. In the patent referred to it is stated that farinaceous food is prepared by combining with the extract there described baked flour. I do not produce a farinaceous food, for by my process the starchy properties contained in the wheat-flour are transformed through the action of the diastase in the malt into dextrine and grape-sugar; neither do I employ baked flour.

The non-farinaceous properties of my food render it of peculiar value to the weakest infant stomachs, since they cannot digest starch until they have teeth, from the fact that the animal saliva does not present itself until that period; hence the reason for using the malt or vegetable diastase.

The Liebig malt extract for infants differs from mine essentially in several respects. Among them may be mentioned the fact that he does not produce a food in a dry form soluble in water when required for use. This I do, which is a diametrical distinction existing between the two foods.

In the Horlick and Horlick decision reported in the 7 O. G. a process of producing food is mentioned. The remarks just above made relative to the difference between my invention and the Liebig article apply equally well in distinguishing it from the Horlick and Horlick process.

In Cooley's Cyclopedia a process of preserving food is described; but it is obvious that such would not apply to the treatment of my article, since it is necessary to constantly manipulate or agitate it, as it is in a semi-fluid state of a sticky mucilaginous nature.

Having thus fully described my invention, I claim—

1. The method herein described of preparing food for infants and invalids, the same consisting in macerating finely-ground barley-malt and cereals in fresh milk, then gradually raising the temperature of the mass to 150° Fahrenheit, or thereabout, and maintaining it at such temperature a proper length of time, or until the starch in the flour has been converted into dextrine and grape-sugar, then raising the mass to 170° Fahrenheit, or thereabout, and maintaining it at that temperature about fifteen minutes, then pressing out the liquid portions, and finally evaporating such liquid portions to dryness, stirring the same to facilitate the process and granulate the resultant mass, substantially as specified.

2. The herein-described dry granulated food for invalids and infants, consisting of the extract of finely-ground barley-malt and cereals macerated in fresh milk, in which the starch contained in the cereals is converted into dextrine and grape-sugar, substantially as described.

In testimony whereof I affix my signature, in presence of two witnesses, this 21st day of February, 1882.

WILLIAM HORLICK.

Witnesses:
OWEN ROBERTS,
JOHN T. WENTWORTH.